United States Patent [19]

Bickel et al.

[11] 3,883,695

[45] May 13, 1975

[54] ALARM REPORTING SYSTEM FOR TRANSMITTING DIGITAL ALARM SIGNALS VIA A TELEPHONE LINE

[75] Inventors: Richard Leroy Bickel, Dallas; Richard Carroll Osborne, Richardson, both of Tex.

[73] Assignee: Vertex Science Industries, Inc., Dallas, Tex.

[22] Filed: May 14, 1973

[21] Appl. No.: 359,723

[52] U.S. Cl. .......... 179/5 R
[51] Int. Cl. .......... H04m 11/04
[58] Field of Search .......... 179/5 R, 5 P; 340/146.1 BA, 164

[56] References Cited

UNITED STATES PATENTS

| | | | |
|---|---|---|---|
| 3,427,402 | 2/1969 | Stokes | 179/2 A |
| 3,598,919 | 8/1971 | Lott | 179/5 P |
| 3,766,320 | 10/1973 | Homme | 179/5 R |
| 3,772,649 | 11/1973 | Haselwood | 340/146.1 BA |

*Primary Examiner*—David L. Stewart
*Attorney, Agent, or Firm*—Richards, Harris & Medlock

[57] ABSTRACT

The specification discloses an alarm reporting system including a plurality of sensor consoles each having at least one alarm sensor connected thereto. Each of the alarm sensors has circuitry for seizing a conventional telephone line in response to the detection of an alarm situation by one of the alarm sensors. Dialing circuitry is provided in the sensor consoles for transmitting digital dialing signals over the seized telephone line. A remotely located central station is responsive to the ringing of the dialed telephone line to seize the telephone line and to transmit a digital tone handshake signal over the telephone line to the calling sensor console. Transmission circuitry at the calling sensor console is responsive to the reception of the handshake signal in order to transmit first digital tone alarm signals which are representative of the identity of the calling sensor console and of the nature of the alarm situation. The central station stores the first digital tone alarm signals and transmits a second digital tone handshake signal. The sensor console then transmits a second digital tone alarm signal to the central station. A comparator circuit at the central station compares the first and second digital tone alarm signals and generates an alarm indication if the two alarm signals match according to predetermined criteria. A plurality of safety features and accessories are provided to enhance the security of the alarm reporting system.

9 Claims, 13 Drawing Figures

| | 00 | 01 | 11 | 10 |
|---|---|---|---|---|
| 00 | 1 | 2 | 4 | 3 |
| 01 | 5 | 6 | 8 | 7 |
| 11 | 13 | 14 | 16 | 15 |
| 10 | 9 | 10 | 12 | 11 |

(a)

| | 00 | 01 | 11 | 10 |
|---|---|---|---|---|
| 00 | $\overline{\text{SEIZE}}$ | SEIZE | SEIZE | SEIZE |
| 01 | DIAL | DIAL | DIAL | DIAL |
| 11 | DIAL | DIAL | DIAL | DIAL |
| 10 | DIAL | DIAL | DIAL | DIAL |

(b)

| | 00 | 01 | 11 | 10 |
|---|---|---|---|---|
| 00 | NORMAL DIAL | WAIT | WAIT | NORMAL DIAL |
| 01 | $\overline{\text{SEIZE}}$ | $\overline{\text{SEIZE}}$ | $\overline{\text{SEIZE}}$ | $\overline{\text{SEIZE}}$ |
| 11 | LONG SEIZE DIAL | WAIT | TROUBLE REPORT | ACT. NO. DIAL |
| 10 | NORMAL DIAL | WAIT | WAIT | NORMAL DIAL |

(c)

| | 00 | 01 | 11 | 10 |
|---|---|---|---|---|
| 00 | DIAL CYCLE | DIAL CYCLE | DIAL CYCLE | DIAL CYCLE |
| 01 | HANG UP | | | |
| 11 | | | | |
| 10 | | | | |

(d)

| | 00 | 01 | 11 | 10 |
|---|---|---|---|---|
| 00 | | | | |
| 01 | | | | |
| 11 | | | TEST CALL | TEST CALL |
| 10 | | | | |

(e)

FIG. 7

ALARM REPORTING SYSTEM FOR TRANSMITTING DIGITAL ALARM SIGNALS VIA A TELEPHONE LINE

FIELD OF THE INVENTION

This invention relates to alarm reporting systems, and more particularly relates to alarm reporting systems wherein a telephone line is seized and digital signals are transmitted to a remote central station.

THE PRIOR ART

A wide variety of different types of automatic burglary and fire alarms have been heretofore developed. Many such emergency alarm systems have required leased telephone lines or have required physically picking up the telephone receiver and transmitting a recorded message. In addition, many previously developed emergency communication systems have utilized recorded messages on magnetic tapes and the like, and were thus subject to mechanical malfunction. Recently, more sophisticated emergency communication systems have been developed wherein digital electrical representations are automatically sent to a central station via conventional telephone lines, with the central station requesting assistance. However, none of the previously developed digital emergency communication systems have been completely satisfactory with respect to safety features which prevent false alarms, or with respect to accuracy or reliability of operation. Indeed, many such previously developed systems have been subject to unauthorized tampering and have not been sufficiently reliable for trouble-free day-to-day operation without substantial maintenence problems.

SUMMARY OF THE INVENTION

In accordance with the present invention, an alarm reporting system includes a plurality of sensor consoles each having at least one alarm sensor connected thereto. Each of the sensor consoles is operable to seize a conventional telephone line in response to the detection of an alarm situation by one of the alarm sensors. Dialing circuitry in the sensor consoles transmits digital dialing signals over the seized telephone lines. A central station is responsive to the ringing of the dialed telephone line for transmitting a digital handshake signal over the telephone line to the calling sensor console. Transmission circuitry at the calling sensor console is responsive to the reception of the handshake signal for transmitting over the telephone line first and second digital alarm signals representative of the identity of the calling sensor console and of the nature of the alarm situation. Comparator means at the central station compares the first and second digital alarm signals and generates an alarm indication if the signals match according to predetermined criteria.

In accordance with another aspect of the invention, an alarm reporting system includes at least one sensor console having an alarm sensor connected thereto. Circuitry in the console is responsive to an output from the alarm sensor in order to seize a telephone line and to transmit predetermined dialing signals over the telephone line to ring a telephone line at a remote location. A central station at the remote location is responsive to the ringing of the line for transmitting a coded tone sequence handshake signal to the sensor console over the telephone line. Transmission circuitry in the console is responsive to reception of the handshake signal for transmitting digital data over the telephone line by modulating one of two simultaneously generated tones. The digital data is representative of the location of the sensor console and the nature of the alarm situation. Upon reception of two identical sets of digital data from the console, the central station initiates an alarm indication.

In accordance with another aspect of the invention, an alarm system is provided wherein a remote sensor console transmits digital alarm signals via a telephone line to a central station. Circuitry in the sensor console automatically dials the telephone number of the central station to enable the transmission of digital alarm signals. Circuitry is responsive to a predetermined number of unsuccessful attempts to dial the telephone number of the central station, in order to automatically dial a second telephone number of a prescribed alternate location. Circuitry is provided to generate audible digital signals via the telephone line when the telephone is answered at the alternate location.

In accordance with yet another aspect of the invention, an alarm system includes circuitry for sensing an alarm situation and for dialing the telephone number of a remote central location. Circuitry is provided to generate an audible alarm at the site of the alarm situation after a predetermined number of unsuccessful attempts to connect through the telephone lines to the remote central station.

DESCRIPTION OF THE DRAWINGS

For a more complete understanding of the present invention and for further objects and advantages thereof, reference may now be made to the following description taken in conjunction with the accompanying drawings, in which.

Figure 1:
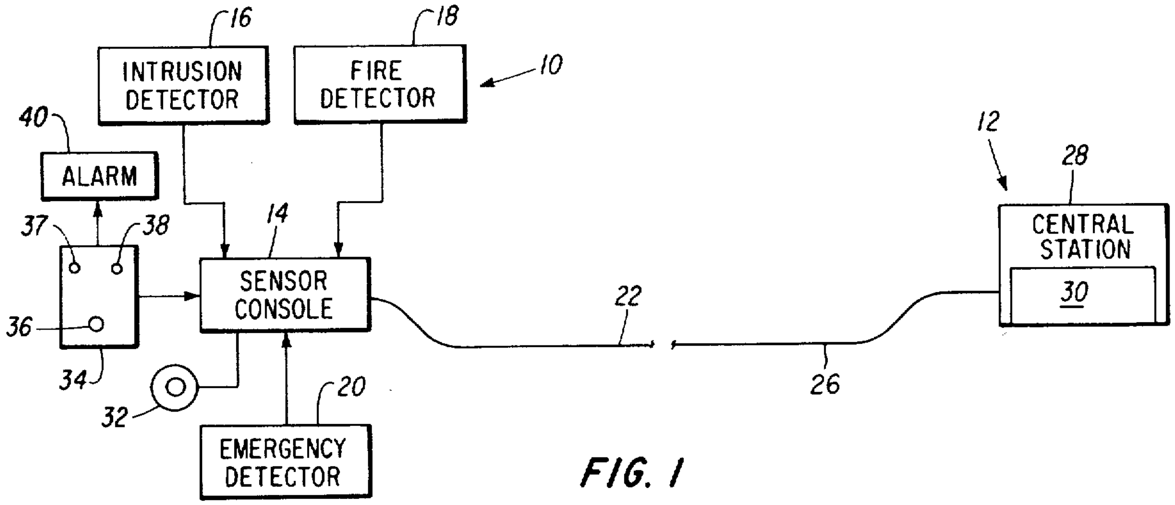
FIG. 1 illustrates a block diagram of a console sensor station and the central station.
Figure 4:
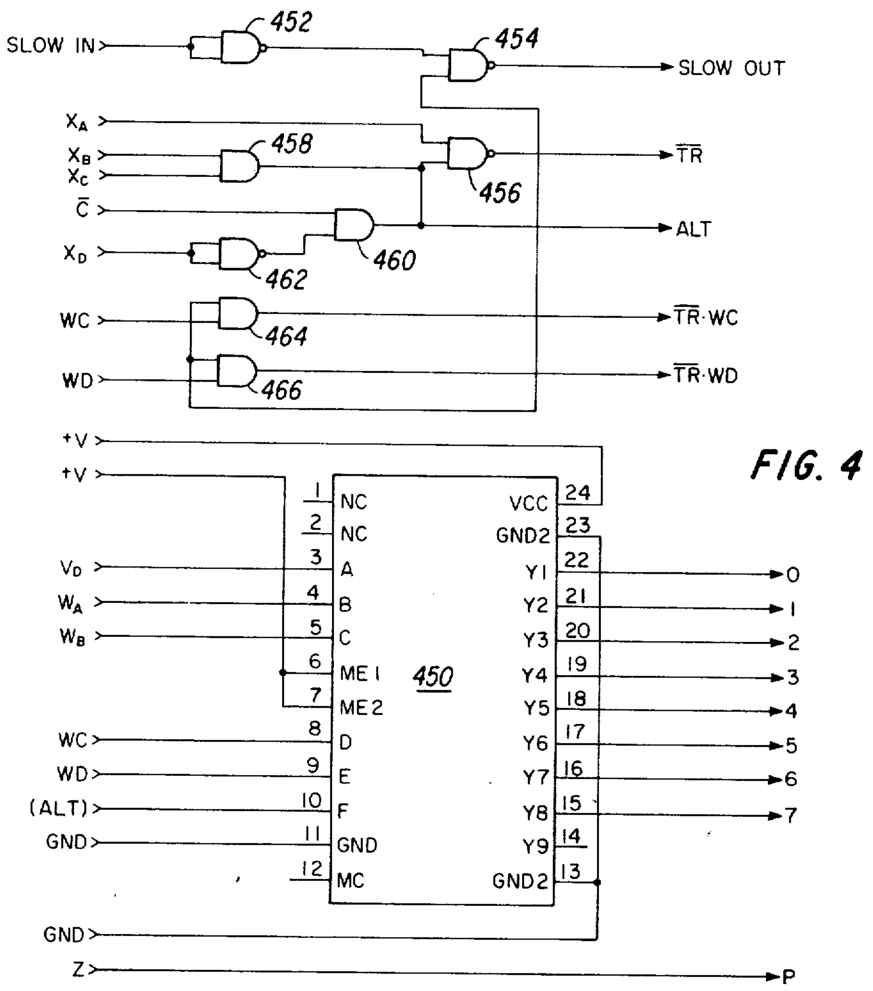

FIGS. *3a* and *3b* are schematic diagrams of the sensor console shown in FIG. 1;

FIG. 4 is a schematic diagram of the program module of the system shown in FIGS. *3a–b;*

Figure 5:
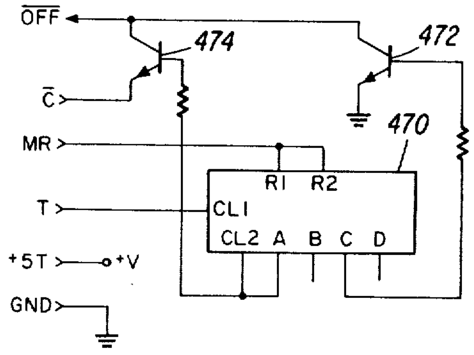
Figure 6:
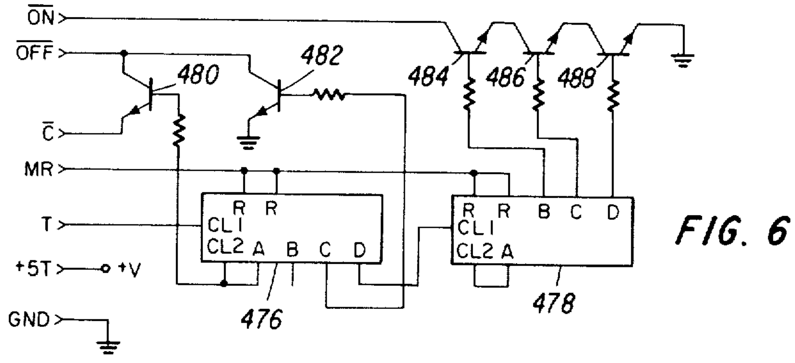

FIG. 5 is a schematic diagram of a portion of the timebase extender circuitry of the invention;

FIG. 6 is a schematic diagram of the remainder of the timebase extender circuit of the invention;

FIGS. *7a–e* are carnough maps of various functions of the present system; and

Figure 8:
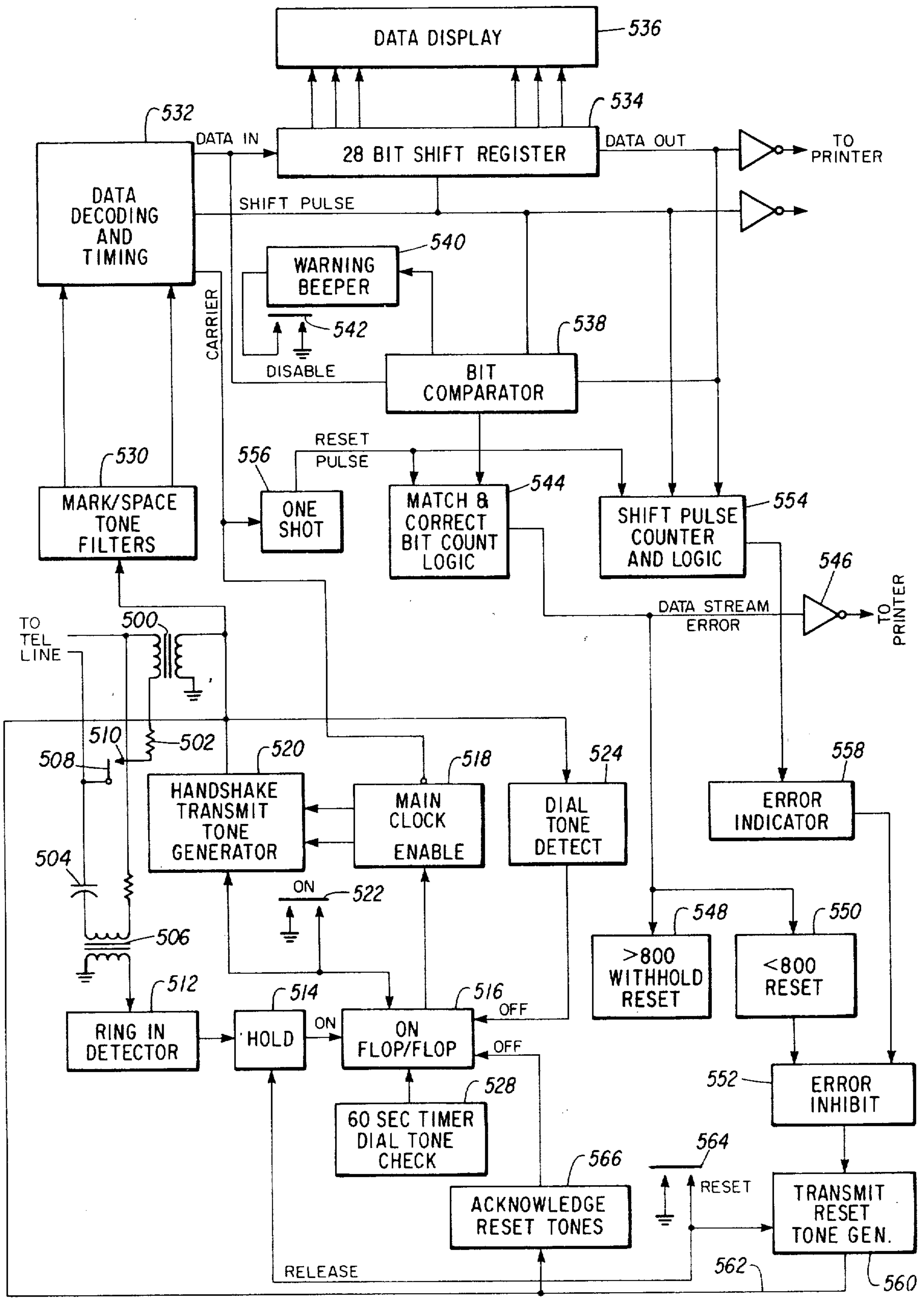

FIG. 8 is a block diagram of the remote central station of the invention.

DESCRIPTION OF THE PREFERRED EMBODIMENT

FIG. 1 illustrates an alarm reporting system comprising an alarm sensing station 10 and a remote central station 12. Station 10 includes a sensor console 14 which is conveniently located in the area to be surveyed, such as within a house or a business. It will be understood that in a complete system, a plurality of sensor consoles will be provided. A plurality of alarm situation detectors, such as an intrusion detector 16, fire detector 18 and an emergency detector 20 are disposed about the premises and are interconnected with the sensor console. Detectors 16, 18 and 20 comprise conventional alarm situation detectors of the type well known in the art which generate an electrical indication on the occurrence of a prescribed alarm situation.

Upon receiving an alarm indication from any of the detectors 16–20, the sensor console seizes a conventional telephone line 22 and transmits digital dialing signals over the telephone line 22. The dialing signals cause the ringing of a telephone line 26 located at the central station location. A central station system 28 includes circuitry which is responsive to the ringing of the line 26 to seize the telephone line 22 and the system goes off-hook. A prescribed digital tone handshake signal is then transmitted from the central station 28 over the telephone line 22 to the sensor console 14. In the preferred embodiment, the handshake signal comprises a pair of audio tones. Specifically, in the preferred embodiment, an audio tone of 1,633 cps is transmitted for 0.8 seconds, afterwhich a second audio tone of 2,125 cps is transmitted simultaneously with the 1,633 cps tone for an additional 0.8 seconds.

Upon reception of the handshake signal, the sensor console 14 transmits digital information regarding the identification of the sensor console and the type of alarm situation. Specifically, in the preferred embodiment, a start bit is transmitted followed by 26 bits defining the identification number of the sensor console 14, information as to the type of emergency situation, and information regarding the employer or the station number in case of multiple businesses owned by the same employer. Preferably, this digital information is transmitted by the use of two carrier audio tones of 770 cps and 941 cps. Both tones are initially transmitted to provide a carrier, and the 770 cps tone is turned off in order to generate the start bit. Both tones are then again transmitted, with the 770 cps tone turned off and on in order to generate digital mark bits, and the 941 cps tone turned off and on to generate a digital space. The 27 bits of digital information is stored at the central station 28 and a second handshake signal is transmitted from the central station 28 to the central console.

Upon receipt of the second handshake signal, the sensor console transmits the identical 27 bits of digital data to the central station via telephone line 22. The central station 28 compares the two transmitted digital data words bit by bit and if all 27 bits of the two transmissions match, an indication of the location of the sensor console 14 and the type of emergency situation is displayed on the display screen 30, which may comprise, for example, LED elements. The operator can then summon the assistance required. If the two data transmissions from the sensor console 14 do not match, a buzzer is rung and the central station 28 generates another handshake signal to request additional transmissions. Four requests for additional transmissions are transmitted from the control station 28, afterwhich a request is made to the operator to trace the call and the telephone line is held open. In this manner, correct operation of the system is assured and false alarms are prevented.

Upon matching of two sequential transmissions from the sensor console 14, a microphone 32 at the central console 14 may be energized in order to enable the operator at the central station 28 to listen in to the vicinity adjacent the sensor console 14. The central station 28 then generates an inverted handshake signal which turns off and resets the sensor console 14. The sensor console then transmits a tone via the telephone line 22 so that the central station 28 can release the telephone line 22.

Another feature of the system shown in FIG. 1 is that, if the sensor console 14 is unsuccessful in getting through to the central station 28 after a predetermined number of times, the sensor console 14 automatically dials a second alternate telephone number and audibly generates digital tone signals at a slow rate such that an operator at the second location can audibly hear the digital information. The operator can then count the digital code being transmitted and can summon assistance. In case it is not possible to get through to the second telephone number, a sensor console 14 dials for an extended period of time, such as for thirty minutes, prior to turning itself off.

A control panel 34 is associated with the intrusion detector 16 and includes a lock 36 which must be operated by a suitable key prior to allowing operation of the detector 16. Lamps 37 and 38 are positioned on the control panel 34. When the lock 36 is initially turned on by the operator, the light 37 blinks on and off for a predetermined short period of time, such as for 2 seconds, and an audible alarm 40 is initially turned on for a short period of time to insure that the system is working correctly. In case the detector 16 is incorrectly set at this time, the alarm 40 will not turn off and will maintain an audible alarm until the problem with the detectors is corrected.

After a predetermined number of attempts by the sensor console 14 from detector 16 to make contact with the central station 28, such as three attempts, the alarm 40 is energized by the sensor console 14 in order to scare a burglar or the like away. If the central station is reached within the predetermined number of dialing attempts, the alarm 40 is not energized so that the burglar may be more easily caught by the authorities.

A lamp 38 is energized when the sensor console 14 is armed. After the central station 28 has been dialed by the sensor console 14 upon initial arming of the system, the lamp 38 is flashed and the operator may speak into the microphone 32 directly to the central station. The central station then sends a tone signal to the sensor console such that the lamp 38 is blinked on and off to indicate to the operator that the central station is listening and that the system is operable. The lamps 37 and 38 are attached directly to the AC power supply and are not connected to the stand-by battery system of the invention. Thus, when the AC supply is malfunctioning, the lamps 37 and 38 are not energized and the operator may tell immediately that the stand-by system is being utilized.

Figure 2:
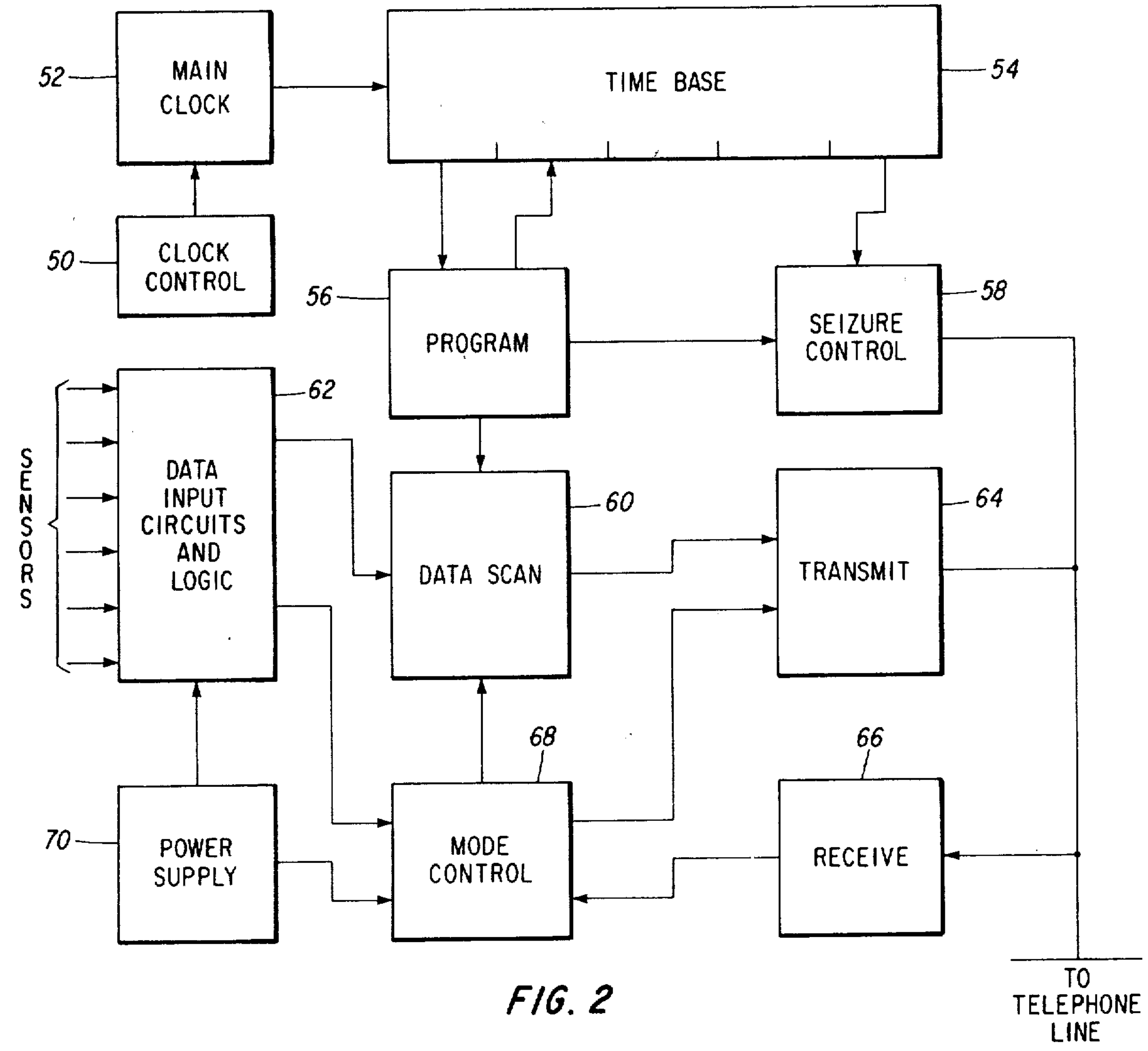
FIG. 2 is a block diagram of the console sensor shown in FIG. 1.

FIG. 2 illustrates a block diagram of the sensor control 14. A clock control 50 controls the operation of a main clock 52 which generates periodic clock signals to a timebase system 54. As will be subsequently described in greater detail, the timebase 54 comprises a series of counters which generate output digital signals to a program circuit 56. The program circuit 56 includes a preset Programmed Read Only Memory (PROM) which generates output control signals in time dependence upon the signals clocked through the counters in the timebase 54. The output of the program circuit 56 controls a seizure control 58 which includes a relay for seizing the telephone lines. A data scan circuit 60 receives input signals through a data input circuit and logic 62 from the various sensors. The sensor outputs are scanned by the data scan circuit 60 and the sensor outputs are directed to a transmit circuit 64. The transmit circuit 64 transmits digital information via the two audio tones in the manner previously described by turning the tones on and off in accordance with the digital information. The audio tones are transmitted via the telephone lines to the central station.

Handshake signals comprising coded audio tones transmitted from the central station are directed to the receive circuit 66, which decodes the handshake signal and generates an indication to the mode control circuit 68. Mode control circuit 68 controls the operation of the various circuits of the system in accordance with the output of the receive circuit 66. Voltage supply for the system is provided by the power supply 70 which generally comprises an AC power supply. In case of failure of the AC power supply, a stand-by battery control supply is provided to enable continuous energization of the system.

Figure 3A:
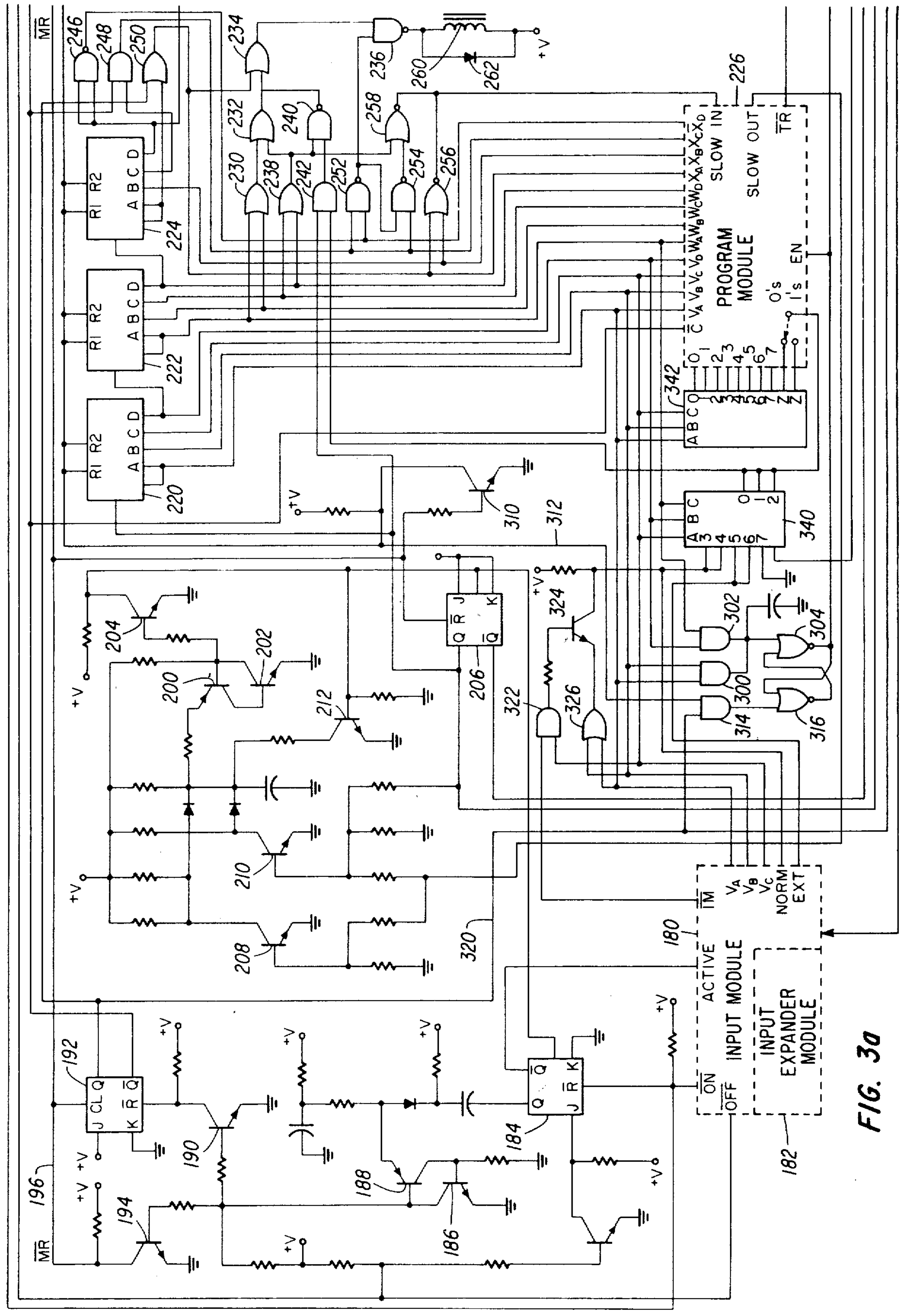
Figure 3B:
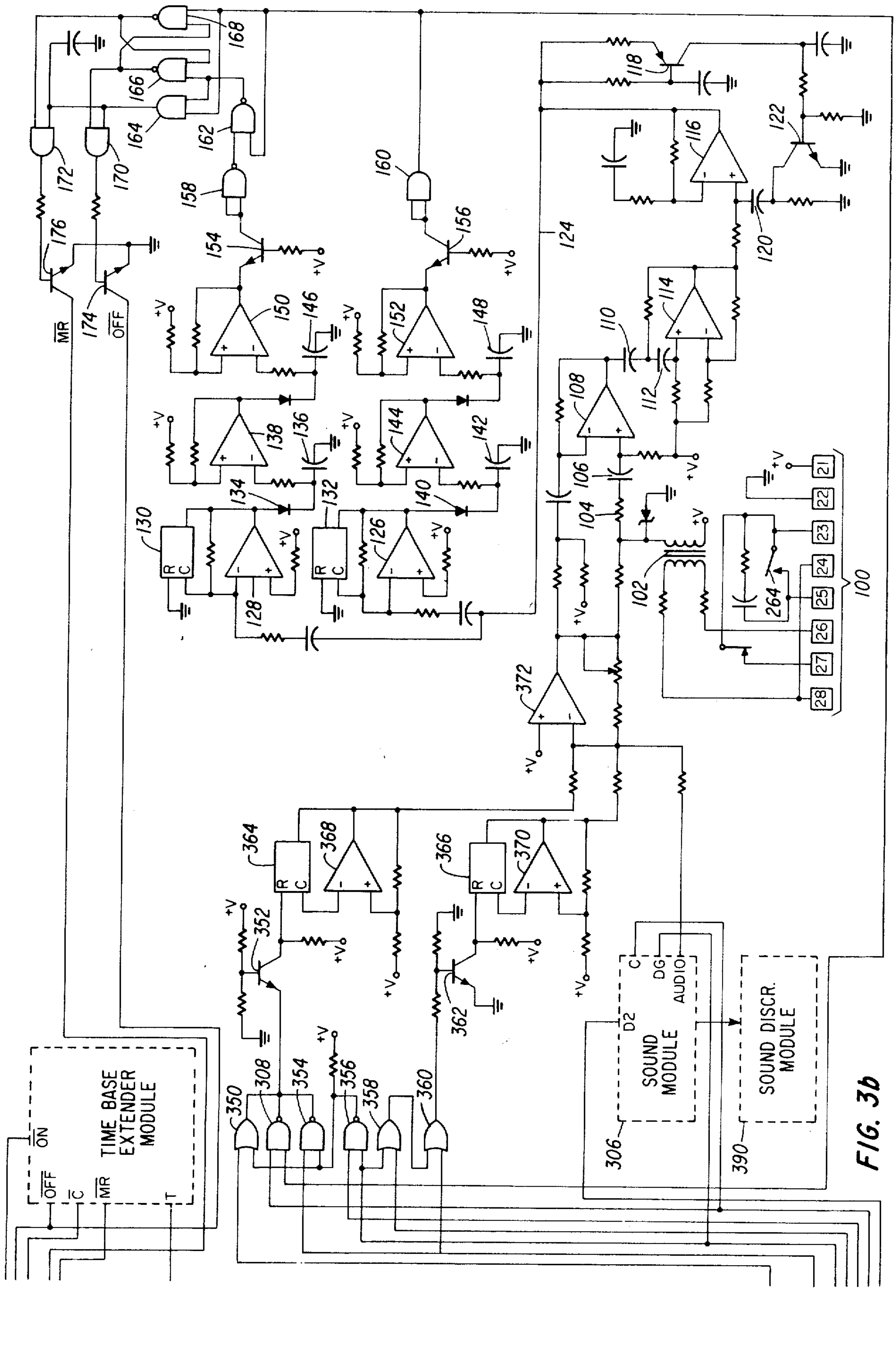

FIGS. 3*a–b* illustrate a schematic diagram of the sensor console 14. The right hand margin of FIG. 3*a* should be matched up with the left hand margin of FIG. 3*b* to provide the entire schematic of the sensor console. Terminals 100 (FIG. 3*b*) are interconnected with the telephone line through a conventional telephone coupler. The terminals labeled 26 and 28 are tied across an audio transformer 102, the output of which is applied through a resistor 104 and capacitor 106 to the input of an operational amplifier 108. The output of amplifier 108 is tied through capacitors 110 and 112 to an input of a second operational amplifier 114. Amplifiers 108 and 114, with the associated circuitry, comprise a 1,200 cps highpass filter in order to eliminate noise and transmitted frequencies.

The output of amplifier 114 is applied to the positive input of an operational amplifier 116. The output of amplifier 116 is applied through a resistance to the emitter of a transistor 118. The positive input of amplifier 116 is tied through a capacitance 120 to the collector of a transistor 122. Amplifier 116 and transistors 118 and 122 and their associated circuitry comprise an AGC circuit to maintain a 2-volt peak-to-peak output during operation of the system. The output of amplifier 116 is applied via lead 124 to the inputs of operational amplifier 126 and 128.

A twin-T filter 130 having a passband of 1,633 cps is connected across an amplifier 128. A twin-T filter 132 having a bandpass of 2,125 cps is connected across amplifier 126. Two paths of different frequencies are thus defined for the tone signals received from the telephone line. The output of the filter 130 is a sinusoidal wave which is rectified by a rectifier 134 and charges up a capacitor 136. The resulting DC input is applied to an operational amplifier 138. Similarly, the output of filter 132 is rectified by a diode 140 and charges capacitor 142. The resulting DC voltage is applied to an input of amplifier 144. The output of amplifiers 138 and 144 are saturated at approximately 9 volts. When the input voltage to amplifiers 138 and 144 is above approximately 9 volts, the output of the amplifiers switches to ground. When the input to the amplifier 138 and 144 is below 9 volts, the capacitors 146 and 148 are charged. When the output of the amplifier 138 and 144 go to ground, the respective capacitor 146 and 148 discharges to a trigger point after a time delay of approximately 0.3–0.4 seconds.

Capacitance 146 is connected through a resistance to the input of an operational amplifier 150, while capacitor 148 is connected through a resistance to the input of an operational amplifier 152. When either of the capacitances 146 or 148 discharge to the trigger point of their respective operational amplifiers 150 and 152, the output of the respective amplifier goes from ground to a positive voltage. The output of amplifier 150 is connected to the emitter of a transistor 154, while the output of amplifier 152 is connected to the emitter of a transistor 156. The collector of transistor 154 is connected to a NAND gate 158, while the output of transistor 156 is connected to an AND gate 160. When the output of amplifier 150 goes positive, the output of gate 158 goes to ground. When the output of amplifier 152 goes positive, the output of gate 160 goes to TTL logic level.

The output of gate 158 is connected through a NAND gate 162 to inputs of an AND gate 164 and a NAND gate 166. The output of gate 160 is tied to an input of gate 164 and also to an input of a NAND gate 168. The outputs of gates 164, 166 and 168 are tied to inputs of AND gates 170 and 172. The outputs of gates 170 and 172 are connected through resistors to the bases of transistors 174 and 176 respectively. The logic provided by gates 164–172 operates in the following manner. If a tone having a frequency of 1,633 cps is initially applied to the terminals 100 from the telephone line, when a tone having a frequency of 2,125 cps subsequently is received by terminals 100, the circuitry operates to pull the collector of transistor 176, termed $\overline{MR}$, to ground to indicate the reception of a valid handshake tone. Conversely, if a tone having a frequency of 2,125 cps is initially received followed by a tone of 1,633 cps, the collector of transistor 164, termed $\overline{OFF}$, is pulled to ground to indicate the reception of a valid reset signal from the remote station. The $\overline{MR}$ signal thus sets the timebase system of the circuit to zero, while the $\overline{OFF}$ signal shuts off the circuit and puts the circuit in the normal stand-by condition.

The various sensors connected to the sensor console are connected to an input module 180 (FIG. 3*a*). The number of sensors capable of being attached to the sensor console may be expanded by the use of an input expander module 182 which may be interconnected into module 180. When one of the sensors senses an emergency condition, the $\overline{ON}$ terminal of module 180 goes to ground. This causes the flipflop 184 to become reset which then sets the timebase circuitry of the circuit to zero. Resetting of the flipflop 184 causes the terminal Q to go to ground, and thus causing a one shot multivibrator comprising transistors 186 and 188 to generate a 12 millisecond pulse. The pulse is applied through a transistor 190 to a flipflop 192 in order to hold the flipflop 192 in reset during the 12 milliseconds that the power is initially turned on. The 12 millisecond pulse generated by the multivibrator comprised of transistors 186 and 188 also energizes a transistor 194 in order to ground lead 196 upon which appears the $\overline{MR}$ signal. Upon termination of the 12 millisecond reset pulse, clock pulses are applied to the timebase circuitry of the invention in order to initiate counting and subsequent operation of the system.

The clock for the system comprises transistors 200, 202 and 204, flipflop 206 and associated circuitry. The clock control circuit includes transistors 208, 210 and 212 and their associated circuitry. In operation, the output of flipflop 206 comprises a periodic clock signal which is applied to a series of counters 220, 222 and 224. The clock signals are clocked through the counters 220–224 and the output of the three counters are directly applied to inputs of a program circuit 226 including a Programmable Read Only Memory (PROM).

The A and B outputs of counter 222 are applied to the inputs of an OR gate 230, the output of which is applied through OR gates 232 and 234 to the input of a NAND gate 236. The C and D outputs of counter 222 are tied to the inputs of an OR gate 238, the output of which is applied to an input of gate 232 and into an input of a NAND gate 240. The Q terminal of flipflop 206 is applied to an input of an AND gate 242, the output of which is applied to gate 240. The A, C and D outputs of counter 224 are applied to inputs of a NAND gate 246, an AND gate 248 and an OR gate 250. The outputs of gates 246 and 248 are applied to inputs of a NAND gate 252 and a NAND gate 254. The output of gate 250 is tied to an input of gate 234 and to an input of a NOR gate 256.

The output of gate 254 is connected through a NOR gate 258 to the Slow In terminal of the program circuit 226. The Slow Out terminal of the program circuit 226 causes the digital tone output of the system to be slowed down during transmission to the second alternate telephone number. The output of gate 236 is connected to a terminal of the seizure relay coil 260 having a diode 262 connected across. The logic provided by the gates which are interconnected to the outputs of the counters 222 and 224 and to the program circuit 226 operates to selectively energize and de-energize the seizure relay 260 to initiate transmission of dialing signals over the telephone line. Energization of the seizure relay coil 260 operates the seizure relay switch arm 264 in order to transmit make and break dialing signals over the telephone lines to the remote station via terminals 23 and 25.

Terminals A, B, C and D of counter 220 and terminal A of counter 222 are interconnected with inputs of AND gates 300 and 302, the outputs of which are applied through a NOR gate 304 to the EN terminal of the program circuit 226 and to the DG input of sound module 306 and to an input of a NAND gate 308. The base of a transistor 310 is connected through a resistance to the $\overline{R}$ terminal of the flipflop 206. The collector of transistor 310 is applied via lead 312 to input of an AND gate 314. The output of gate 314 is applied through a NOR gate 316 to an input of NOR gate 304. The Q output of flipflop 192 is applied via lead 320 to an input of gate 314. The $\overline{IM}$ output of the input module 180 is applied to an input of an AND gate 322, the output of which is applied through a resistance to the base of a transistor 324. The emitter of transistor 324 is applied to the output of an OR gate 326. The $V_a$ and $V_b$ outputs of input module 180 are applied to inputs of gate 326.

The collector of transistor 324 is connected to terminals of a data selector circuit 340, which receives and scans the sensor outputs from the input module. Outputs from counter 220 are also connected to the data selector 340. Likewise, outputs from counter 220 are connected to a second data selector circuit 342 which scans the program circuit 226. Data selector circuits 340 and 342 may comprise, for example, the 8312P scanner circuit manufactured and sold by Motorola Corporation. The logic circuitry comprising gates 300–304 and 314–316 operate to supply outputs from the counters 220–224 to the scanning circuits. Gates 300–304 and 314 and 316 thus develop a DATA gate. When the system initially starts transmitting data, this logic goes positive and turns on the tone oscillators. After 27 bits of data have been transmitted, the logic goes off and stops the operation of the oscillators. The $\overline{TR}$ output of the PROM 226 is connected to an input of a NOR gate 350, the output of which is applied to an emitter of a transistor 352. The EN output of PROM 226 is applied to inputs of an NAND gate 354, the output of which is also connected to the transistors 352.

The Q output of flipflop 206 is tied to an input of a NAND gate 356. The Q output of flipflop 206 is tied to a NOR gate 358. The EN output of PROM 226 is tied to an input of an AND gate 360. The output of gate 360 is connected through resistances to the base of a transistor 362. The emitter of transistor 352 is connected to a twin-T filter 364 having a bandpass of 770 cps. The collector of transistor 362 is connected to a Twin-T filter 366 having a bandpass of 941 cps. An operational amplifier 368 is connected to filter 364 to form a first 770 cps tone generator, while an operational amplifier 370 is connected across the twin-T filter 366 to form a second 941 cps tone generator. The outputs of the filters are applied to the negative input of an operational amplifier 372, which applies tone signals through the transformer 102 for transmission via the telephone lines to the remote station. When the collector of either transistor 352 or 362 is grounded, the two tone generators comprising the filter 364 and amplifier 368 and filter 366 and amplifier 370 oscillate to generate audio tones. The tones are modulated in response to the program circuit 226 and the sensor outputs to provide indications of the customer identification, the type of sensor sensing the alarm condition, and the like. A sound discriminator module 390 may be interconnected into the system in order to enable the system to be actuated by a predetermined sound occurring at the premises.

FIG. 4 illustrates in schematic detail the circuitry of the program circuit 226 which includes a Programmable Read Only Memory (PROM) 450 which may comprise, for example, a 64 word × 8 bit SN74186 PROM manufactured and sold by Texas Instruments, Inc. of Dallas, Tex. As is known, PROM 450 may be programmed in any desired manner by burning out fused links or the like. Thus, the first and alternate telephone numbers to be dialed by the system, and the customer identification number and any other digital data desired to be transmitted, may be easily programmed into the PROM 450. The Slow Input signal of the invention is applied to the inputs of a NAND gate 452 the output of which is applied to a NAND gate 454. The $X_a$ output from counter 224 is applied to an input of a NAND gate 456, the output of which comprises $\overline{TR}$. The $X_b$ and $X_c$ outputs from counter 224 are applied to inputs of an AND gate 458, the output of which is applied to gate 456. The C signal applied from the timebase extender module is applied to the input of an AND gate 460, the output of which comprises the ALT signal. The $\overline{X_d}$ signal applied from counter 224 is applied to inputs of a NAND gate 462, the output of which is connected to gate 460. The $W_c$ signal from counter 222 is applied to the input of AND gate 464. The output of gate 464 comprises the $\overline{TR} \times W_c$ signal. The output signal $W_d$ from counter 222 is applied to AND gate 466, the output of which comprises $\overline{TR} \times W_d$.

FIGS. 5 and 6 illustrate the circuitry which comprises the timebase extender module shown in FIG. 3b. Referring first to FIG. 5, the circuit includes a 4 bit binary counter 470 which may comprise, for example, a 7493 binary counter. The C output of the counter 470 is connected to the base of a transistor 472. The A output of the counter 470 is connected to the base of a transistor 474.

Referring to FIG. 6, a pair of 4 bit binary counters 476 and 478 are interconnected in the manner illustrated. The A output of counter 476 is connected to the base of a transistor 480, while the C output of counter 476 is connected to the base of a transistor 482. The B, C. and D outputs of counter 478 are respectively connected to bases of transistors 484, 486 and 488. The operation of the timebase extender is to continue dialing operations of the system for an extended period of time, such as for approximately one-half hour, in case the central station does not answer the dialing. In operation of the circuitry shown in FIG. 5, if the system is in the dialing mode, the signal $\overline{C}$ applied to the emitter of transistor 474 is high. After approximately 6 minutes, the A output of counter 470 will go positive. However, the circuit waits until the C output of counter 470 goes positive after approximately 26 minutes prior to shutting the system off. If a handshake signal is received from the central station during the 26 minutes, the signal $\overline{C}$ goes to ground and after 6 minutes the A output of counter 470 goes positive and the dialing operation is shut off.

The circuit shown in FIG. 6 operates the system such that every 25 and one-half hours the system is automatically turned on to check out the telephone lines and to insure that the system is working properly.

FIG. *7a–e* comprise Carnough maps which illustrate the operation of the system. FIG. *7a* illustrates the sequence of operation initiated by the outputs of counter 220, FIG. *7b* illustrates the operation of counter 222 and FIG. *7c* illustrates the operation of counter 224. FIG. *7d* illustrates the operation of counters 470 and 476 and FIG. *7e* illustrates the operation of counter 478. The *x* coordinates of each of the maps is representative of the digital logic output of the A and B output terminals of the respective counters, while the Y axis of each of the maps is representative of the digital logic outputs of the C and D terminals of the respective counter. Inasmuch as the logic of the four outputs of each of the counters 220–224 and 470, 476 and 478 change periodically during operation of the system, the changing outputs are utilized to sequence the PROM 450 to carry out the functions of the system.

For example, assume that the twelve milliseconds reset pulse applied from the multivibrator comprising transistor 186 and 188 has terminated, and clock pulses are then applied to the string of counters 220, 222, 224 and to the timebase extender module. The 4 outputs from the counter 220 are applied directly to the program circuit 226, with the output D of the counter providing clocking to the PROM 450.

Referring to FIG. *7a*, the basic sequence of operation of the succeeding maps is established by the outputs of counter 220. The functions shown in the maps of FIGS. *7b–7e* should be read in the order shown in FIG. *7a*. Referring to FIG. *7b*, in the first cycle of operation of counter 222, the telephone lines are seized and a time delay of approximately 4.8 seconds is provided to allow the dial tone of the telephone system to come on. After the time delay, signals are applied from the counter 222 to the PROM 450 in order to initiate the desired dialing sequence. The PROM generates signals which are applied through the logic to operate the seizure relay 260 in order to open and close the relay switch arm 264 to transmit dialing signals over the telephone lines.

Referring to FIG. *7c*, in the first cycle of operation of counter 224, the normal dialing operation previously described is performed. In the next cycle of operation, the seizure relay is held for a period of 25.6 seconds to wait for the remote central station to transmit a handshake signal. If no handshake is received from the remote station during this time, another normal dialing operation is provided and a waiting period of 25.6 seconds is again provided to wait for the handshake signal. If no answer is received, then for 102.5 seconds the seizure relay 260 is opened in order to clear the line according to the calling party disconnect feature. After this period, the telephone line is again seized and another 25.6 second normal dialing cycle is provided. If a handshake signal has not been received at this time, it is assumed that the telephone lines are down or inoperative, so a long seizure dial is provided wherein a 20 second waiting period is provided prior to dialing.

A normal dialing operation is then provided, along with the wait of 25.6 seconds. A trouble report is then provided and the alternate second telephone number is dialed. A normal dialing operation is then provided to the second alternative number, but at this time the digital code is slowed down and is audibly beeped out over the telephone line so that the operator can count the code without the requirement of having an electronic central station. The beeping of the code lasts approximately 102 seconds. The slowing down of the system is provided by the Slow Signal previously described. If no answer is received from the remote station, all of the functions described in FIG. *7a–c* are repeated four times, as indicated in FIG. *7b*. This repeat of 4 times of the cycle takes approximately 34 minutes. If no reply is received at this time, the system is hung up. As shown in FIG. *7e*, at intervals of approximately 25.5 hours, a test call is initiated to the central station to receive a handshake to ensure that the system is operating properly.

As previously described, during operation of the system, the timebase signal supplied from the counters 220–224 are applied to the PROM 450 and eight simultaneous outputs are provided from the PROM. These outputs are scanned by the data selector 342. The address from the PROM is continuously changed to provide new outputs in order to control the functions in the manner previously described. During the dialing operation, a logic "1" is applied to the PROM 450 for each dialing pulse desired. Each output from the PROM is 1/10th of a second in order to provide a normal 1/10th dial period. The dialing of each pulse according to the system is done directly, with no comparisons or the like required.

After the phone number has been dialed, when the handshake arrives, the $\overline{MR}$ is applied and the timebase is set to zero and the flipflop 192 is turned on. This indicates that the system is no longer dialing and the system is prepared to send out the 27 bits of data. When the signal $\overline{MR}$ goes up, the clock of the system starts counting through the 27 pulses. The first 12 pulses come from the PROM 450 which includes the customer identification number and the like. If a sound monitor is being utilized, a particular 800 code number is transmitted wherein the central station does not reset, but remains on to listen through the microphone at the system in the manner previously described. If an input expander module 182 is utilized with the system, seven additional zones may be detected by the system.

AS previously noted, the data selector 340 picks up the bits from the input sensors at the correct time and the output of the selector 340 turns on and off the tone sequence generators to transmit the digital data over the telephone lines.

FIG. 8 illustrates the circuitry of the central station. A transformer 500 is connected through a suitable coupler with a conventional telephone line, with one terminal of the transformer being connected through a resistance 502 and capacitor 504 to a terminal of transformer 506. The opposite terminal of transformer 506 is connected to a seizure relay switch arm 508 which may be moved into and out of contact with a terminal 510. The output of transformer 506 is applied to a ring-in detector 512 which is tuned to detect the ringing signal on the telephone line. The output of detector 512 is applied to a hold circuit 514, which includes the seizure relay coils which operate the seizure relay switch arm 508.

The output of the hold circuit 514 is connected to a flipflop 516 in order to turn the flipflop 516 on. The flipflop 516 is connected to the enable terminal of a main clock 518. The output of the main clock is utilized to provide timing to the remainder of the circuitry. For example, the clock 518 is utilized to time the handshake transmit tone generator 520 which generates the handshake signal comprised of two tones, previously described, and which is transmitted through transformer 5C0 and through the telephone lines to the sensor console. An on button switch 522 is provided to manually energize the system. The output of the transformer 500 is connected to a dial tone detection circuit 524, the output of which is applied to the flipflop 516 in order to turn the flipflop off after the dial tone is detected. A 60 second timer 528 is connected to turn the flipflop 516 on in order to provide a periodic check on the dial tone.

The output of the transformer 500 is also connected to mark/space tone filters 530 which detect the digital tone data transmitted from the sensor console. A decoder 532 decodes the digital tone data filtered by the filter 530 and applies the input data into a 28 bit shift register 534 for storage. The data stored in the register 534 is displayed on the data display 536, which may comprise, for example, a light emitting diodes (LED) display. The operator at the central location can view the display and can initiate the appropriate procedure to provide assistance to the sensor console. The first and second digital transmissions from the sensor console are compared bit by bit by a compartor 538. If any of the respective bits of the two digital signals do not compare, a no comparison signal is generated from the comparator 538 and a warning beeper 540 is energized to alert the operator of an incorrect comparison. A push button switch 542 may be operated by the operator to disable the beeper 540.

A match and correct bit count logic circuit 544 is provided to generate an indication of a correct match. The indication of a correct match may be applied through an invertor 546 to a printer, if desired. The output of logic 544 is also applied to logic circuits 548 and 550 which determine whether or not the correctly matched signal transmitted from the sensor console includes an 800 code or not. The 800 code is assigned to systems having the listen-in microphone capability. If the 800 code is provided, the reset of the system is inhibited so that the operator at the central station may listen to the audible sounds occurring at the sensor console. If the 800 code is not detected at 550, a reset signal is provided to the transmitter reset tone generator 560, unless inhibited by an error indication. The output of the shift register 534 is applied to a shift pulse counter and logic 554, along with the shift pulses output from the data decoding and timing circuit 532. A one shot multivibrator 556 is operated by the start of the carrier signal from 532 to generate a reset pulse which is applied to the logic 544 and to the logic 554. The output of logic 554 is provided to the error indicator 558 which generates an output indicating the occurrence of an error which is applied to inhibit circuit 560.

Upon the occurrence of an error, it is desirable to generate additional handshake tones in order to enable the reception of additional digital data from the sensor console. Therefore, an output from the error indicator circuit 558 is applied to a transmit reset tone generator 560 in order to inhibit the generation of a reset signal. Unless a signal is generated from the error indicator circuit 558, the reset tone is generated from the generator 560 via line 562 and is applied via the telephone lines to the sensor console in order to reset the sensor console. A push button 564 may be manually operated in order to manually reset the system. Upon detection of a dial tone by 524, the flipflop 516 is turned off. In addition, an output from the acknowledge reset tones 566 turns the flipflop 516 off in order to disable the main clock 518 and release the seizure relay.

It will thus be seen that the present invention provides an alarm reporting system which is automatically operable and is extremely reliable in operation. This system includes a plurality of safety features for the prevention of false alarms and includes circuitry to prohibit the circumvention of the reporting of an alarm by an unauthorized person or due to a malfunction of the system.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. An alarm reporting system comprising:

a plurality of sensor consoles each having at least one alarm sensor connected thereto, means in each said sensor console for seizing a conventional telephone line in response to the detection of an alarm situation by one of said alarm sensors, dialing means in said sensor consoles for transmitting digital dialing signals over the seized telephone line, a central station responsive to the ringing of the dialed telephone line for transmitting over the telephone line to the calling sensor console a digital handshake signal, transmission means at said calling sensor console responsive to the reception of said handshake signal for transmitting over the telephone line first digital alarm signals representative of the identity of the calling sensor console and of the nature of the alarm situation, means at said central station for storing said first digital alarm signals and for transmitting another digital handshake signal, whereupon said transmission means transmits a second digital alarm signal over the telephone lines, comparator means at said central station for generating an alarm indication if said first and second digital alarm signals match according to predetermined criteria, means for dialing a second alternate telephone number if the telephone is not answered at said central station, and means for slowing down the transmission of said digital alarm signals via the telephone lines to the alternate telephone station.

2. The system of claim 1 and further comprising:

test means manually operable by an operator to transmit said first and second digital alarm signals to thereby energize said microphone, and visual display means at said sensor console operable from said central station to indicate to the operator that the system is functioning correctly.

3. The system of claim 1 and further comprising:

means at said central station for transmitting an inverted digital handshake signal to said sensor console in order to terminate operation of said sensor console and to reset said sensor console, and means at said central station responsive to a tone transmitted from said sensor console in order to release the telephone line.

4. The system of claim 1 and further comprising:

time extender means for continually dialing the telephone number of said central station for an extended period of time if said central station does not answer.

5. An alarm reporting system comprising:

at least one sensor console having an alarm sensor connected thereto, means in said console responsive to an output from said alarm sensor for seizing a telephone line and for transmitting predetermined dialing signals over the telephone line to ring a telephone line at a remote location, a central station at said remote location having means responsive to the audio ringing of said line for seizing the telephone line and for transmitting a coded tone sequence handshake signal to said sensor console over the telephone line, transmission means in said console responsive to receiption of said handshake signal for transmitting digital data over the telephone line by modulating one of two simultaneously generated tones, said digital data respresentative of the location of said sensor console and the nature of the alarm situation, means at said central station for receiving and storing said digital data and for again transmitting said handshake signal to said sensor console, said transmission means responsive to said handshake signal for again transmitting said identical digital data to said sensor console, comparator means in said sensor console for comparing the two transmissions of digital data and for generating an alarm indication upon matching of the two transmissions, and reset means in said central station for generating an inverted handshake signal to reset said sensor console.

6. In an alarm system wherein a remote sensor console transmits digital alarm signals via a telephone line to a central station, the combination comprising:

means in said sensor console for automatically dialing the telephone number of the central station to enable the transmission of digital alarm signals, means responsive to a predetermined number of unsuccessful attempts to dial the telephone number of the central station for automatically dialing a second telephone number of a prescribed alternate location, and means for generating audible digital signals via the telephone line at a reduced rate when the telephone is answered at the alternate location.

7. An alarm reporting system comprising:

at least one sensor console having an alarm sensor connected thereto, means in said console responsive to an output from said alarm sensor for seizing a telephone line and for transmitting predetermined dialing signals over the telephone line to ring a telephone line at a remote location, a central station at said remote location having means responsive to the audio ringing of said line for seizing the telephone line and for transmitting a coded tone sequence handshake signal to said sensor console over the telephone line, transmission means in said console responsive to reception of said handshake signal for transmitting digital data over the telephone line by modulating one of two simultaneously generated tones, said digital data representative of the location of said sensor console and the nature of the alarm situation, means at said central station for receiving and storing said digital data and for again transmitting said handshake signal to said sensor console, comparator means in said sensor console for comparing the two transmissions of digital data and for generating an alarm indication upon matching of the two transmissions, and said handshake signal comprising a single tone for a prescribed time interval and a pair of tones for a time interval.

8. An alarm reporting system comprising:

at least one sensor console having an alarm sensor connected thereto, means in said console responsive to an output from said alarm sensor for seizing a telephone line and for transmitting predetermined dialing signals over the telephone line to ring a telephone line at a remote location, a central station at said remote location having means responsive to the audio ringing of said line for seizing the telephone line and for transmitting a coded tone sequence handshake signal to said sensor console over the telephone line, transmission means in said console responsive to reception of said handshake signal for transmitting digital data over the telephone line by modulating one of two simultaneously generated tones, said digital data representative of the location of said sensor console and the nature of the alarm situation, means at said central station for receiving and storing said digital data and for again transmitting said handshake signal to said sensor console, said transmission means responsive to said handshake signal for again transmitting said identical digital data to said sensor console, comparator means in said sensor console for comparing the two transmissions of digital data and for generating an alarm indication upon matching of the two transmissions, and means for slowing down the transmission of said digital alarm signals via the telephone lines to the alternate telephone station.

9. An alarm reporting system comprising:

at least one sensor console having an alarm sensor connected thereto, means in said console responsive to an output from said alarm sensor for seizing a telephone line and for transmitting predetermined dialing signals over the telephone line to ring a telephone line at a remote location, a central station at said remote location having means responsive to the audio ringing of said line for seizing the telephone line and for transmitting a coded tone sequence handshake signal to said sensor console over the telephone line, transmission means in said console responsive to reception of said handshake signal for transmitting digital data over the telephone line by modulating one of two simultaneously generated tones, said digital data representative of the location of said sensor console and the nature of the alarm situation, means at said central station for receiving and storing said digital data and for again transmitting said handshake signal to said sensor console, said transmission means responsive to said handshake signal for again transmitting said identical digital data to said sensor console, comparator means in said sensor console for comparing the two transmissions of digital data and for generating an alarm indication upon matching of the two transmissions means at said central station for transmitting an inverted digital handshake signal to said sensor console in order to terminate operation of said sensor console and to reset said sensor console, and means at said central station responsive to a tone transmitted from said sensor console in order to release the telephone line.

* * * * *